United States Patent [19]

(12) United States Patent
Jones

(10) Patent No.: US 8,406,414 B2
(45) Date of Patent: Mar. 26, 2013

(54) METHOD AND APPARATUS FOR DYNAMICALLY SCHEDULING RINGING SIGNALS

(75) Inventor: Jonathan Jones, Austin, TX (US)

(73) Assignee: Microsemi Semiconductor (U.S.) Inc., Austin, TX (US)

( * ) Notice: Subject to any disclaimer, the term of this patent is extended or adjusted under 35 U.S.C. 154(b) by 811 days.

(21) Appl. No.: 12/576,941

(22) Filed: Oct. 9, 2009

(65) Prior Publication Data

US 2011/0085652 A1 Apr. 14, 2011

(51) Int. Cl.
*H04M 1/00* (2006.01)
*H04M 9/00* (2006.01)

(52) U.S. Cl. ............. 379/399.01; 379/399.02; 379/400; 379/413.01

(58) Field of Classification Search ............... 379/90.01, 379/201.02, 372, 399.01–413.04, 418, 385, 379/376.02, 373.02, 373.01
See application file for complete search history.

(56) References Cited

U.S. PATENT DOCUMENTS

| | | | | |
|---|---|---|---|---|
| 4,406,004 A * | 9/1983 | Hall et al. | ...... | 379/180 |
| 5,142,569 A * | 8/1992 | Peters et al. | ...... | 379/207.16 |
| 5,764,755 A * | 6/1998 | Chen | ...... | 379/413.01 |
| 6,320,879 B1 * | 11/2001 | Bremer | ...... | 370/493 |
| 6,714,644 B1 * | 3/2004 | Cohn et al. | ...... | 379/418 |
| 7,031,465 B1 * | 4/2006 | Dibble et al. | ...... | 379/418 |
| 7,046,797 B2 * | 5/2006 | Canella et al. | ...... | 379/413.01 |
| 7,792,282 B1 * | 9/2010 | Huang et al. | ...... | 379/418 |

* cited by examiner

*Primary Examiner* — Ahmad Matar
*Assistant Examiner* — Nafiz E Hoque
(74) *Attorney, Agent, or Firm* — Williams, Morgan & Amerson, P.C.

(57) ABSTRACT

A method for scheduling ringing signals for a plurality of subscriber lines includes maintaining a schedule of ringing signals for the plurality of subscriber lines. A plurality of ringing counts is determined. Each ringing count specifies a number of subscriber lines ringing at a selected point in the schedule. A ringing request for a particular subscriber line is received. A position in the schedule for the ringing request is identified based on the ringing counts that does not exceed a maximum ringing limit. The ringing request is scheduled in the schedule responsive to identifying the position. A ringing signal is generated for the particular subscriber line in accordance with the schedule.

20 Claims, 7 Drawing Sheets

METHOD AND APPARATUS FOR DYNAMICALLY SCHEDULING RINGING SIGNALS

CROSS-REFERENCE TO RELATED APPLICATIONS

Not applicable.

BACKGROUND

The disclosed subject matter relates generally to telecommunications and, more particularly, to a method and apparatus for dynamically scheduling ringing signals.

In communications systems, particularly telephony, it is common practice to transmit signals between a subscriber station and a central switching office via a two-wire bi-directional communication channel. A line card generally connects the subscriber station to the central switching office. A line card typically includes a plurality of subscriber line interface circuits (SLIC) as well as one or more subscriber line audio-processing circuits (SLAC). The functions of the line card range from providing a power supply to performing wake-up sequences of circuits to allow communications to take place.

Subscriber line interface circuits (SLICs) have been developed to provide an interface between a low voltage signal path in a telephone central office and a high-voltage telephone subscriber line. The SLIC provides functions such as off hook detection, ringing signal generation, and battery feed to the subscriber line. The subscriber line consists of a telephone transmission line, including two conductors referred to as A and B or tip and ring, and the subscriber telephone equipment coupled across the tip and ring conductors (i.e., the load). The subscriber line and the subscriber telephone equipment are also referred to as a subscriber loop.

The SLIC provides power from the telephone central office to the subscriber line in response to a received battery voltage. The battery voltage is a DC voltage supplied to the SLIC to power the SLIC and the subscriber line. A typical value of the battery voltage is −48 VDC. The battery voltage has a value generally in the range −20 to −60 VDC. The SLIC supplies a DC current at the battery voltage to the subscriber line. Superimposed on the DC current are AC signals of audio frequency by which information is conveyed between the subscriber and the central office. The battery voltage is generated at the central office, either by a depletable energy storage device such as a battery or by a DC generator, for supply to the SLIC. In a central office, one battery or DC generator supplies the battery voltage to many SLICs and their associated subscriber loops.

In many modern applications, a SLIC is located remote from the central office, relatively close to the subscriber telephone equipment and coupled to the subscriber telephone equipment by a relatively short subscriber line. For example, in fiber in the loop (FITL) applications, the SLIC is located in the same city neighborhood as the subscriber telephone equipment and is coupled to the subscriber telephone equipment by tip and ring conductors no more than a few hundred feet in length. The SLIC or an associated circuit receives optical signals from the central office over an optical fiber and converts the optical signals to AC electrical signals. In response to the electrical signals, the SLIC supplies AC signals of audio frequency, along with DC power from the battery, to the subscriber line. In such applications, where the SLIC and battery are remote from the central office, one battery or battery voltage generator may supply the battery voltage to only one or a few SLICs and their associated subscriber loops.

Newer generation chipsets are designed to operate in high density line card applications. The limited board space available in such line cards constrains the size of the package that is available for the devices like the SLIC and the SLAC. Another consideration that also reduces the size of the package is the desire to have lower per line cost for the line card. In general the smaller packages do not present a problem when the associated device does not generate significant heat. However for silicon devices, like the SLIC, that interface with the telephone line, the reduced silicon die size and the reduced package size coupled with the requirement of having to drive out heavy duty ringing signals to the telephony equipment present a challenging design problem with respect to heat generation.

In general, the ringing state is a challenging state in terms of power dissipation for the SLIC device. In a ringing state, the SLIC makes use of all of the available battery sources to drive out the maximum ringing signal. The rationale behind driving out the maximum possible ringing is that the SLIC needs to apply upwards of 40Vrms for the ringing signal at the longest loop (>1900 ohms) across a ringer load that is at least 5 REN. REN stands for Ringer Equivalent Number. It is a measurement of how much ringing power certain telephone equipment takes. REN numbers are used in the United States to designate how many pieces of telephony equipment can be connected to the same subscriber line and still get them ringing properly.

Because of the significant power requirements for generating high voltage AC ringing signals, the power supply for the line card must be sized to provide sufficient power to support the ringing signals. Generally, the peak power requirements for the line card are dictated based on the number of lines on the line card that can ring simultaneously. Sizing the power supply to support simultaneous ringing of all the subscriber lines, while being the most conservative approach, is also the most expensive.

Another alternative is to set a maximum limit for the number of lines that can ring simultaneously. Thus, the power requirements may be reduced and the power supply can be smaller. The line card will have sufficient power if the simultaneous ringing limit is never exceeded.

Typically ringing signals are cadenced, where a sequence of ringing intervals is separated by corresponding silence intervals. In theory, by interleaving the ringing intervals of multiple lines, the ringing intervals of some of the lines can be aligned with the silence intervals of other lines, to increase the effective number of lines that can ring simultaneously.

Ringing signal interleaving has been employed in the past to increase the effective ringing capacity of the line card. However, the ringing cadences were set at design time, and the interleaving was fixed. The lines on the line card were statically scheduled so that each line had an assigned timeslot for ringing. For example, in a typical cadence employed in the United States, a two second ringing interval is followed by a 4 second silence interval. This arrangement provides three timeslots for ringing, each ringing timeslot being shifted by two seconds. This approach has several limitations. For instance, when "distinctive ring" cadences are employed, the beginning portion or the even entire cadence does not follow the static 2 s ring/4 s silence pattern. Moreover, in some markets, such as the United Kingdom, a leading silence interval is provided prior to the first ringing interval to allow for caller ID data transmission. In the United States, the caller ID data is sent in the silence interval following the first ringing interval. In applications where such variable length ringing and silence intervals were possible, the static line scheduling approach cannot be used.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method for scheduling ringing signals for a plurality of subscriber lines. The method includes maintaining a schedule of ringing signals for the plurality of subscriber lines. A plurality of ringing counts is determined. Each ringing count specifies a number of subscriber lines ringing at a selected point in the schedule. A ringing request for a particular subscriber line is received. A position in the schedule for the ringing request is identified based on the ringing counts that does not exceed a maximum ringing limit. The ringing request is scheduled in the schedule responsive to identifying the position. A ringing signal is generated for the particular subscriber line in accordance with the schedule.

Another aspect of the disclosed subject matter is seen in a line card including a plurality of subscriber line interface circuits and a ringing scheduler. The subscriber line interface circuits are operable to generate ringing signals on associated subscriber lines. The ringing scheduler is operable to maintain a schedule of the ringing signals, determine a plurality of ringing counts, each specifying a number of subscriber lines ringing at a selected point in the schedule, receive a ringing request for a particular subscriber line, identify a position in the schedule for the ringing request based on the ringing counts that does not exceed a maximum ringing limit, schedule the ringing request in the schedule responsive to identifying the position, and direct the associated subscriber line interface circuit to generate the ringing signal for the particular subscriber line in accordance with the schedule.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
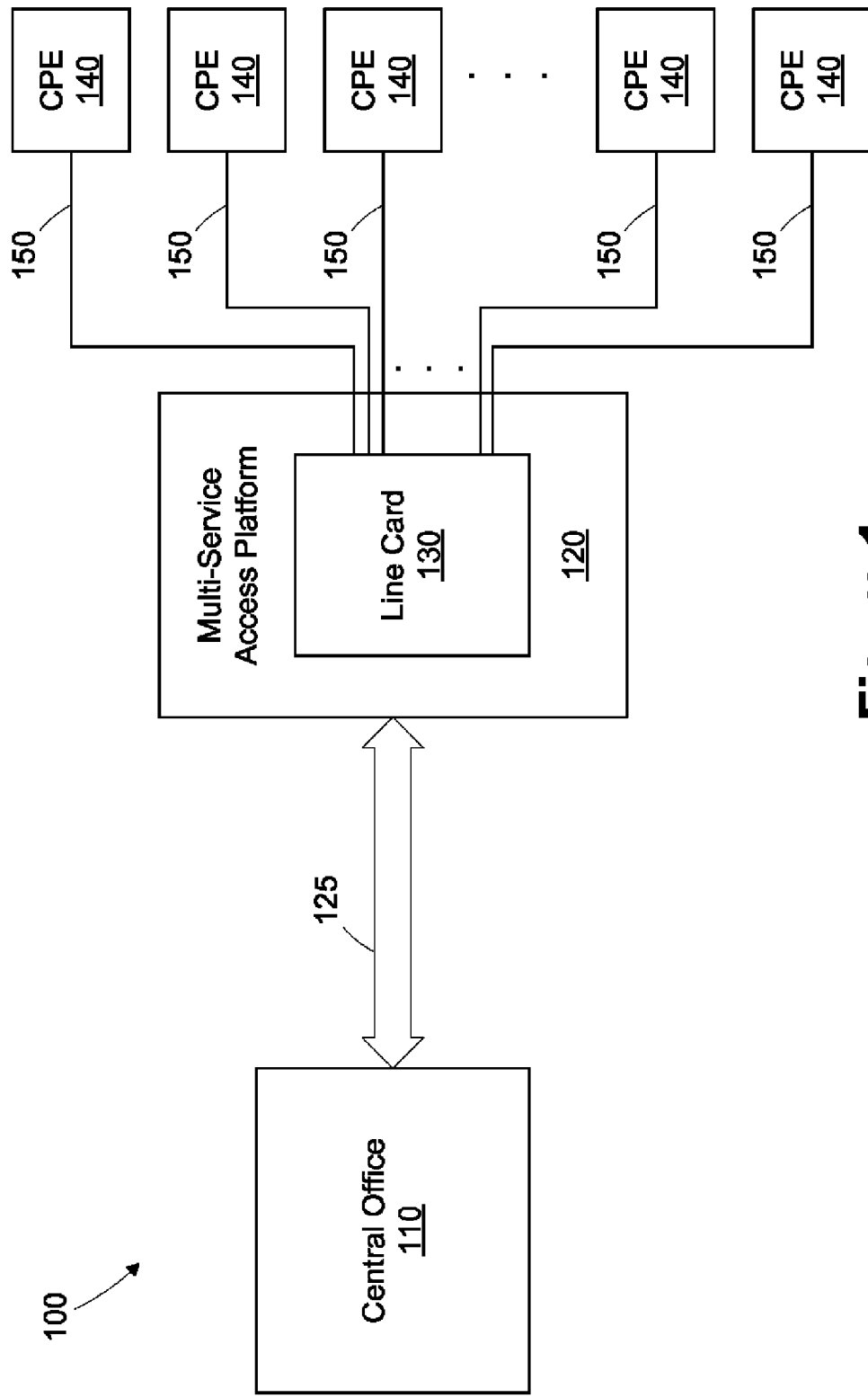
FIG. 1 is a simplified block diagram of a communications system in accordance with one illustrative embodiment of the present subject matter.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a communication system 100. The communication system 100 includes a central office 110 coupled to a multi-service access platform (MSAP) 120 by an optical link 125. The MSAP 120 includes a line card 130 for interfacing with one or more pieces of customer premises equipment 140 through subscriber lines 150 (e.g., twisted pair connections). The subscriber lines 150 may be used to support voice as well as data communication (e.g., DSL communication).

Figure 2:
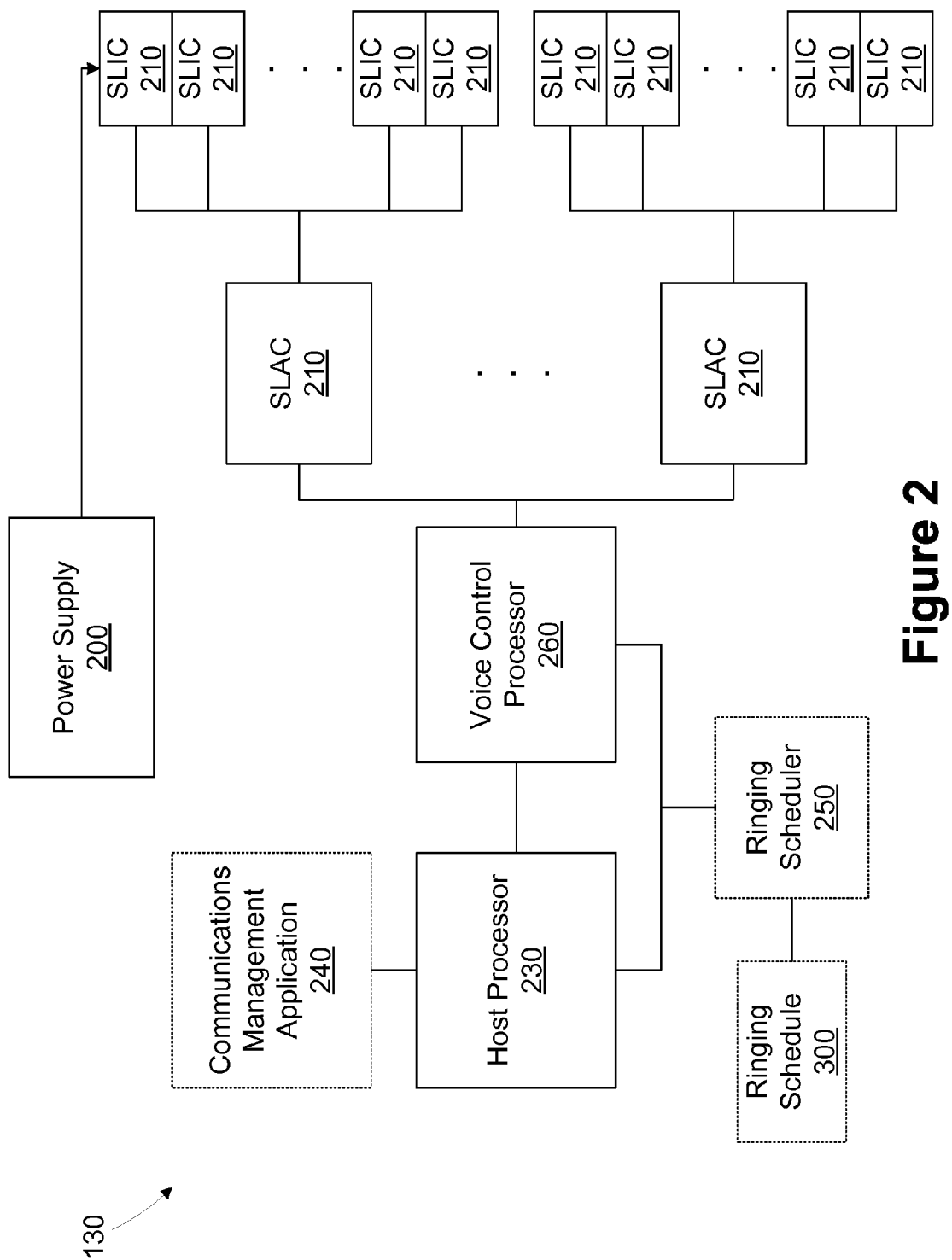
FIG. 2 is a simplified block diagram of a line card in the system of FIG. 1.

Turning now to FIG. 2, a simplified block diagram of the line card 130 is shown. The diagram is intended to be representative in nature in that the functions attributed to the elements of the line card 130 may be distributed differently, and more than one circuit board may actually be present. The line card 130 includes a power supply 200, one or more subscriber line audio-processing circuits (SLAC) 210, a plurality of subscriber line interface circuits (SLIC) 220, a host processor 230 implementing a communication management application 240, and a ringing scheduler 250. In some embodiments, the communication management application 240 is provided and installed by the service provider for controlling the communication system 100. A voice control processor (VCP) 260 running one or more software applications for managing the operations of the line card 130 (e.g., installed by the manufacturer of the line card) may also be provided. The ringing scheduler 250 may be implemented by the host processor 230, the VCP 260 or some other general purpose processor, digital signal processor, or customized processing device.

Figure 3A:
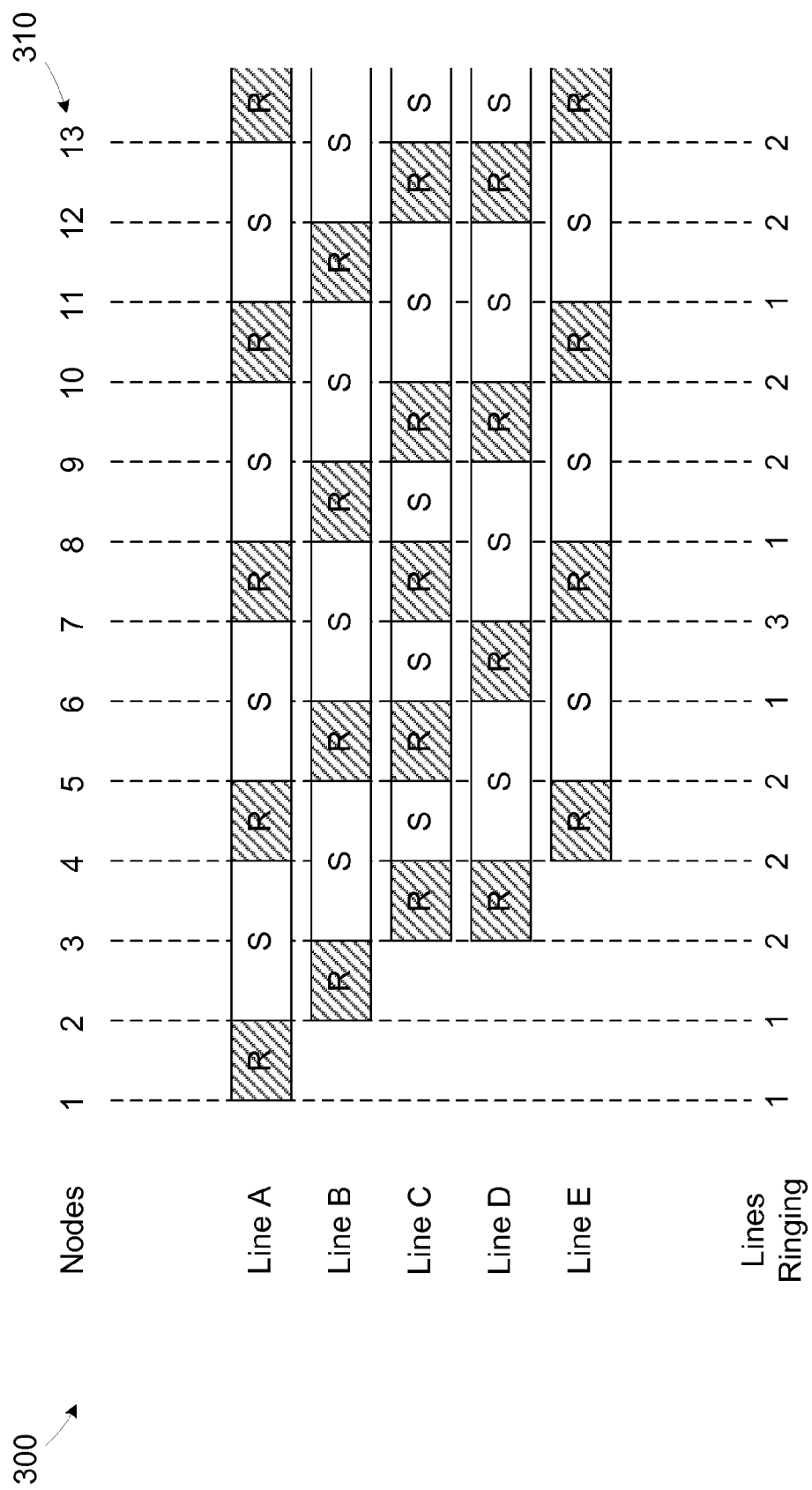
FIGS. 3A-3E are diagrams of ringing schedules implemented by a ringing scheduler.
Figure 3B:
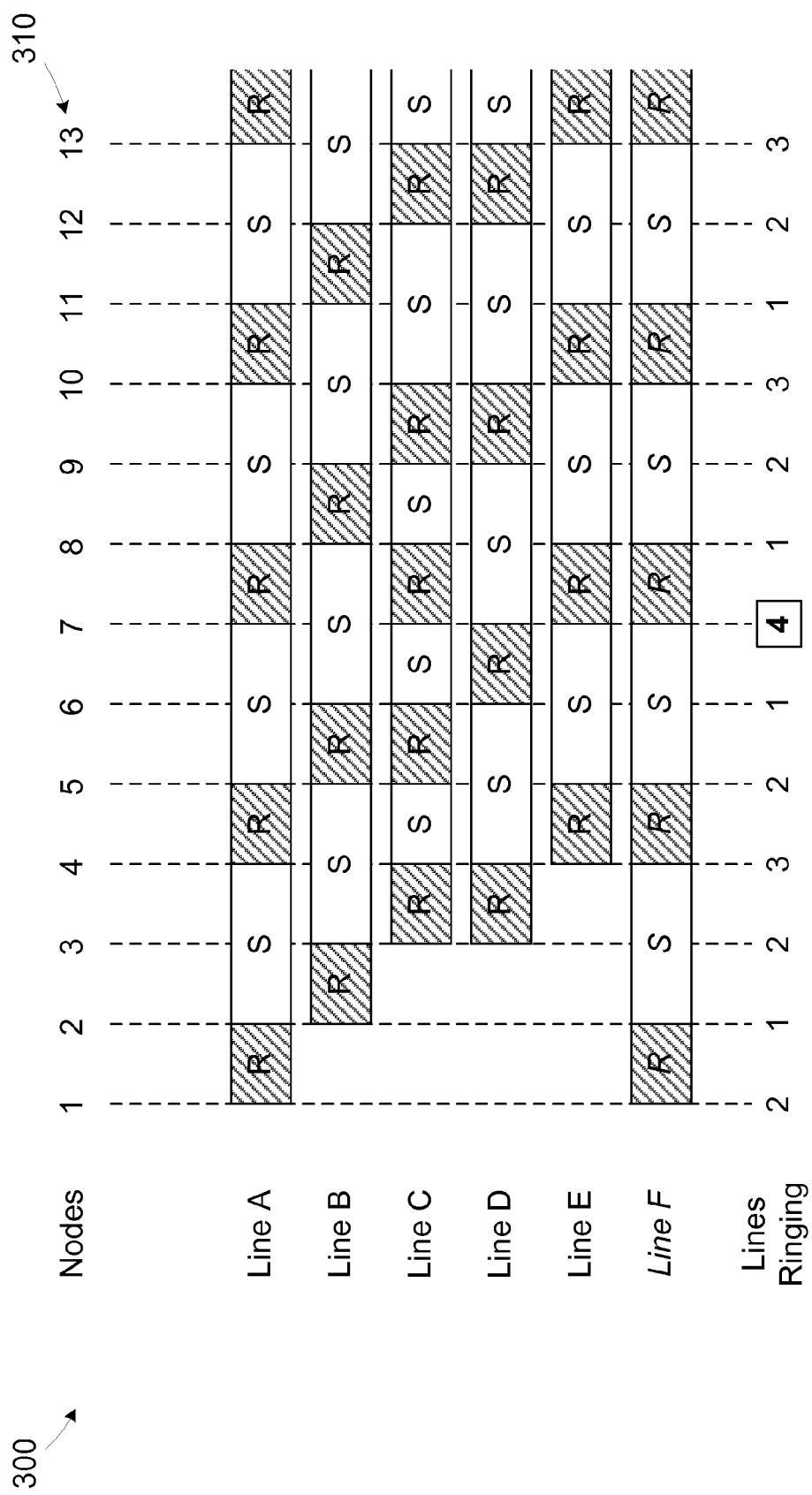
Figure 3C:
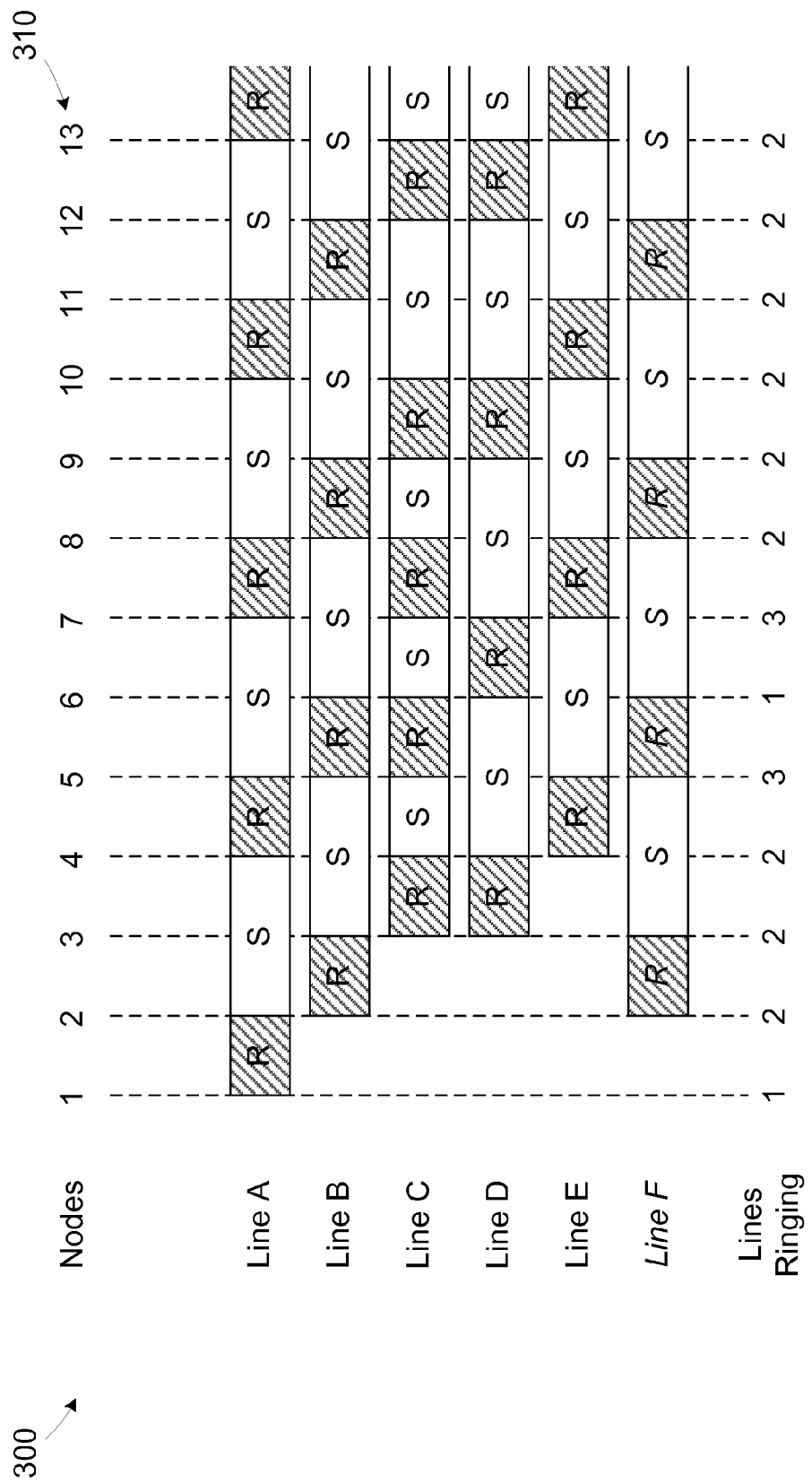

As described in greater detail in reference to FIGS. 3A-3C, the ringing scheduler 250 maintains a ringing schedule 300 that tracks all active ringing cadences for the subscriber lines 150. Hence, by evaluating the schedule 300, the ringing scheduler 250 can determine at any current or future point in time, how many of the subscriber lines 150 have a ringing signal being applied. Entries in the ringing schedule 300 specify start and stop times for ringing intervals and start and stop times for silence intervals. Each entry in the ringing schedule 300 is associated with a particular subscriber line 150. For example, the ringing cadences for lines A, B, D and E represent conventional 2 s ringing/4 s silence ringing cadences, and the ringing cadence for line C represents a distinctive ring signal, where the beginning ringing intervals differ from the normal cadence. As used herein the term cadence refers to a signal with ringing intervals and silence intervals, however, those intervals need not be regular or periodic.

The schedule 300 is defined by nodes 310 that are generated for each transition between ringing and silence. For example, at node 1, a two second ringing interval for line A is defined in the schedule. At node 2, a four second silence interval for line A and a two second ringing interval for line B are defined. The schedule entries at node 7 include two second ringing intervals for lines A, C, and E and a four second silence interval for line D. Note that there is no entry at node 7 for line B, as it is in the middle of the silence interval previously defined at node 6. Hence, the ringing schedule 300 is essentially a list of intervals and their associated lines. Based on the defined ringing and silence intervals, the ringing scheduler 250 maintains a count of lines ringing at every node 310 in the schedule 300.

When trying to schedule a new ringing cadence based on a signal from the communication management application 240, the ringing scheduler 250 enforces a maximum limit on the number of lines that may be ringing at any particular time. The ringing request specifies the cadence for the ringing line (e.g., standard cadence or distinctive ring). Because nodes 310 are defined for each transition between ringing and silence, the ringing scheduler 250 only evaluates the effect of a new ringing request at each node.

FIG. 3B illustrates a scenario where the ringing scheduler 250 receives a ringing request from the communication management application 240 for line F and attempts to schedule the cadence (i.e., a conventional 2 s/4 s cadence). For purposes of this simple illustration, the ringing limit is assumed to be 3 lines. In an actual implementation, the line card 130 may support 72 lines or more, so a higher ringing limit would be used.

The ringing scheduler 250 tentatively schedules a new cadence for line F at node 1, which represents the current time. Based on the intervals added to the schedule for line F, the ringing scheduler 250 computes the lines that would be ringing at each node. Note that at node 7, four lines would be ringing, which violates the ringing limit. Consequently, the ringing scheduler 250 removes the entries for line F, and moves to the next node to attempt to add the cadence for line F.

As shown in FIG. 3C, the ringing scheduler 250 tentatively schedules the cadence for line F starting at node 2 and recalculates the number of lines ringing at each node 310. In this case, the ringing limit is not violated, so the ringing scheduler 250 confirms the cadence schedule and returns the confirmed schedule to the communication management application 240.

In the example illustrated in FIG. 3, the nodes line up at two second intervals to simplify the illustration. In an actual implementation, ringing requests may be received and scheduled at non-regular intervals. In the illustrated embodiment, the granularity of the ringing schedule 300 is 1 ms, however, the granularity may vary depending on the implementation.

In some embodiments, the SLAC 210 may be equipped with a built-in ringing engine. The SLAC 210 is informed of the cadence and generates the ringing signal with the appropriate ringing and silence intervals. The ringing scheduler 250 schedules the cadence and then instructs the SLAC 210 when to start the cadence. In other embodiments where the SLAC 210 does not automatically control the ringing signal, the ringing scheduler 250 may direct the SLAC 210 as to when to start and end each interval.

In implementing the scheduling, the ringing scheduler 250 may have a defined maximum start delay for the ringing request (e.g., 5-10 s). If the ringing scheduler 250 cannot schedule the cadence to start within the maximum start delay interval, it returns an error code to the communication management application 240. In response to the error code, the communication management application 240 may impose a "busy signal" on the requesting line or provide some other indication that the call cannot be completed at that particular time.

The length of a ringing cadence may be limited to a particular time interval. The service provider operating the communication system 100 may specify a maximum ringing time. Due to the time limits imposed by the maximum start delay and the maximum ringing time, the ringing scheduler 250 only needs to track the ringing schedule over a limited time frame. The ringing scheduler 250 may implement a scheduling horizon that limits the time into the future that it looks to schedule a cadence for a new ringing line. Generally, the scheduling horizon is equal to the sum of the longest expected ringing cadence plus the maximum start delay. If the line does not go off-hook prior to the cadence duration limit expiring, the service provider may notify the caller that the callee is not answering and terminate the ringing. Alternatively, a new cadence request for the line may be sent to the ringing scheduler 250 after the maximum ringing time limit is reached. In such a case, the caller may hear an abnormal off interval due to the start delay for the renewed cadence.

In general, there are latencies associated with the communication system 100 due to the software and hardware processing of the scheduling and ringing commands. A scheduling latency may be defined as the amount of time that elapses after the ringing scheduler 250 requests that a line start ringing before the ringing signal is actually applied. This latency includes command processing latency in the SLAC 210 and VCP 260, as well as any other delays that may arise in the host processor 230 or software. The scheduling latency is often difficult to predict and may vary across implementations.

To address the variable scheduling latency, the ringing scheduler 250 implements a guard time that specifies a minimum separation between the end of one ringing interval and the start of a subsequent ringing interval on another line. Enforcing a guard time prevents the end of one ringing interval from overlapping the beginning of the subsequent ringing interval, which could violate the maximum ringing limit. The particular guard time chosen may vary depending on the particular implementation. In one embodiment, the guard time is about 25 ms.

There are various techniques for implementing the guard time. In one embodiment, the ringing scheduler 250 may employ a make interval trim parameter to allow the ringing cadence to be shortened to enable the cadence to be scheduled. Generally, the make interval trim compensates for the increase in the off interval duration due to the guard time. The make interval trim is generally a multiple of half of the ringing signal wavelength to allow the SLAC 210 to remove the ringing signal at the zero cross point. In an embodiment where the ringing scheduler 250 controls the actual ringing signal, the ringing scheduler 250 may send the stop ringing signal 25 ms ahead of the actual scheduled termination.

In another embodiment, the communication management application 240 may factor the guard time and the make interval trim parameter into the ringing request by changing the cadence. Instead of specifying a 2 s ringing interval, the communication management application 240 may specify a 1.975 s ringing interval and a 4.025 s silence interval (i.e., assuming a 25 ms guard time). The ringing scheduler 250 may then schedule the cadence as a 2 s/4 s cadence, but the SLAC 210 will actually terminate the ringing slightly in advance due to the modified cadence.

In the illustrated embodiment, the communication management application 240 controls the time clock for executing the schedule. The communication management application 240 sends an Add_Cadence( ) command for a particular line that specifies the cadence. The ringing scheduler 250 attempts to schedule the new cadence. If scheduling for the cadence is not possible over the scheduling horizon given the maximum ringing limit and the maximum start delay, the ringing scheduler 250 returns an error code. If the cadence is successfully scheduled, the ringing scheduler 250 returns a start delay that specifies the time shift applied to the cadence. When the start delay has elapsed, the communication management application 240 executes a Tick( ) function to execute the schedule. The Tick( ) function informs the ringing scheduler 250 how much time has elapsed. In response to the Tick( ) function, the ringing scheduler 250 removes the nodes from the beginning of the schedule 300 as they are processed. If a cadence is scheduled to start at the current node based on the time that has elapsed from the Tick( ) function, the ringing scheduler 250 issues the ringing command to the SLAC 210 or controls the ringing itself. If the communication management application 240 waits too lone to call the Tick( ) function, such that a scheduled cadence is missed, or an error causes the Tick( ) function to skip a scheduled cadence start, the ringing scheduler 250 may issue an error code to the communication management application 240. The ringing scheduler 250 may choose to start the cadence later and delete or trim one or more of the intervals to catch up or cancel the cadence entirely and require the communication management application 240 to reschedule the cadence.

Figure 3D:
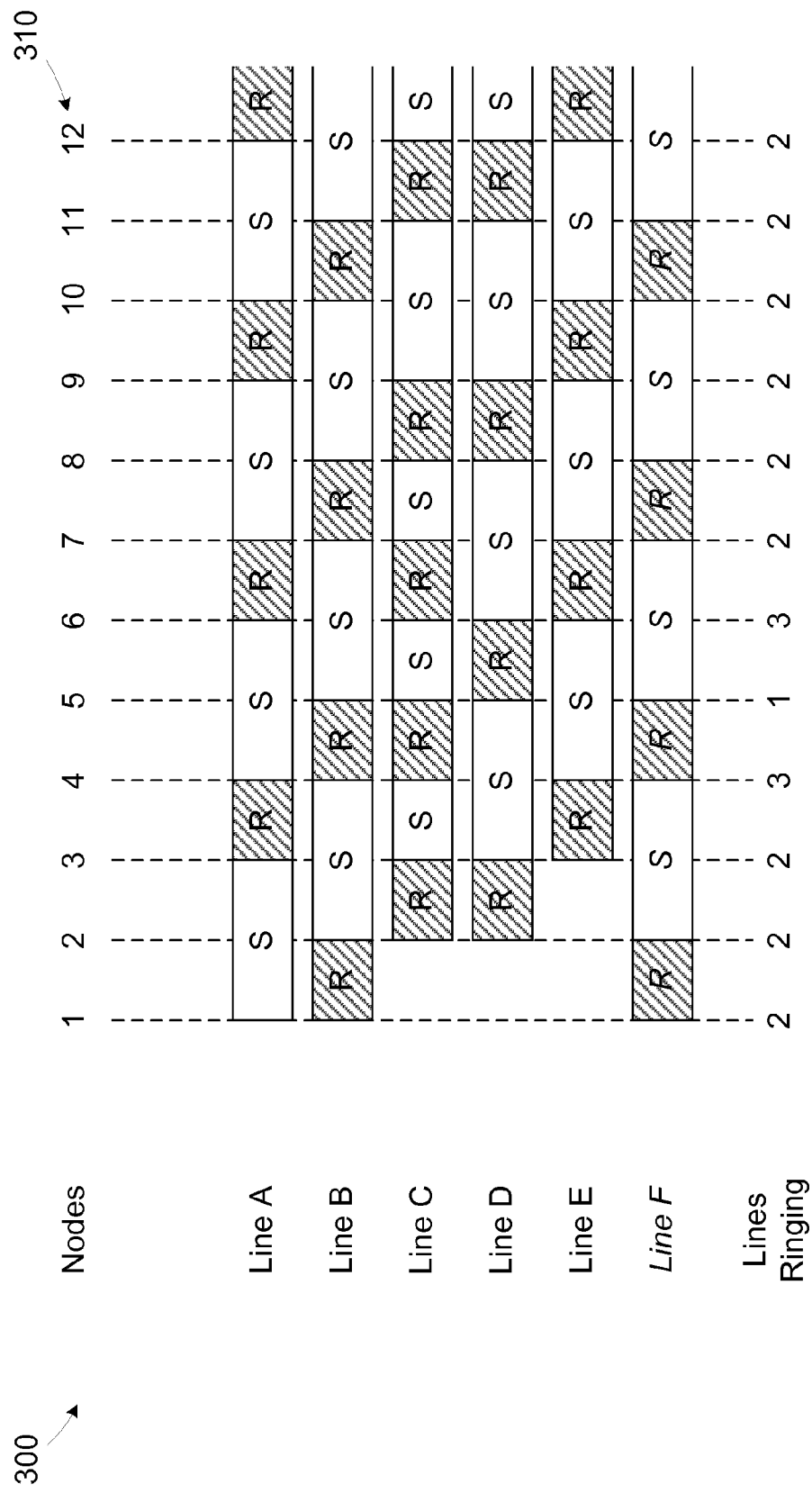

For example, consider the schedule shown in FIG. 3C. When the cadence for line F was scheduled, the ringing scheduler 250 returns a start delay of 2 s. The communication management application 240 responds with a Tick (2 s) after the start delay has elapsed. As shown in FIG. 3D, the ringing scheduler 250 removes the nodes that have passed and executes the ringing cadence for lines B and F.

Figure 3E:
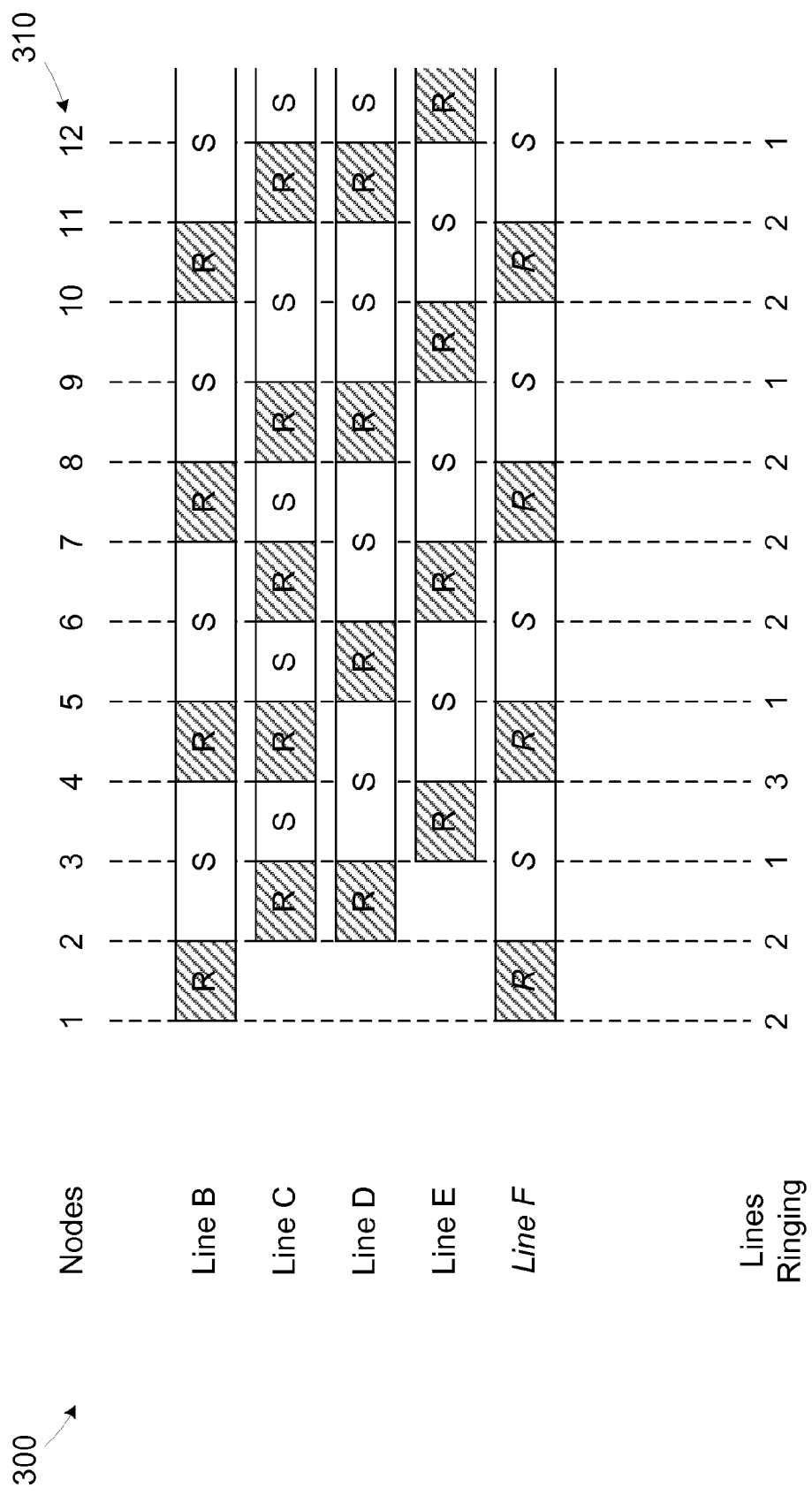

When an off-hook is detected on a particular line, the ringing terminates. The ringing scheduler 250 receives an off-hook indication from the communication management application 240 embodied in a Remove_Cadence( ) command, removes the intervals for the affected line from the schedule, and recalculates the node ringing values. In FIG. 3E, an off-hook detection for line A is received (i.e., Remove_Cadence(Line_A)) and the intervals associated with line A are removed from the schedule 300.

The ringing scheduler 250 allows dynamic scheduling of regular and irregular cadences. The expected cadences for a particular application need not be known in advance to configure the system. Increased scheduling efficiency reduces the requirements for the power supply 200 for the line card 130 and/or allows more lines to be serviced.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

I claim:

1. A method for scheduling ringing signals for a plurality of subscriber lines, comprising:
   maintaining a schedule of ringing signals for the plurality of subscriber lines in a processor device;
   determining a plurality of ringing counts in the processor device, each specifying a number of subscriber lines ringing at a selected point in the schedule;
   receiving a ringing request for a particular subscriber line in the processor device;
   identifying a position in the schedule for the ringing request based on the ringing counts that does not exceed a maximum ringing limit in the processor device;
   scheduling the ringing request in the schedule in the processor device responsive to identifying the position;
   identifying an error condition in the processor device responsive to not identifying a position in the schedule that does not exceed the maximum ringing limit subject to a maximum start delay between when the ringing request is received and when the ringing signal for the particular subscriber line is scheduled to start; and
   generating a ringing signal using an interface circuit for the particular subscriber line in accordance with the schedule.

2. The method of claim 1, further comprising identifying an error condition in the processor device responsive to not identifying a position in the schedule that does not exceed the maximum ringing limit.

3. The method of claim 1, wherein each ringing signal comprises a cadenced signal including a plurality of ringing intervals and a plurality of silence intervals, and the method further comprises:
   defining a node in the schedule for each transition between a ringing interval and a silence interval for each of the ringing signals in the processor device; and
   determining a ringing count for each of the nodes in the processor device.

4. The method of claim 3, wherein identifying the position further comprises:
   tentatively scheduling the ringing signal associated with the ringing request to start at a first node in the schedule;
   updating the ringing counts based on the tentatively scheduled ringing signal; and
   repeating the tentative scheduling and updating of the ringing counts at different nodes in the schedule until the position is identified that results in the updated ringing counts not exceeding the maximum ringing limit.

5. The method of claim 1, wherein each ringing signal comprises a cadenced signal including a plurality of ringing intervals and a plurality of silence intervals, and the method further comprises establishing a guard time between an end of a first ringing interval from one of the subscriber lines and a start of a second ringing interval from another of the subscriber lines in the processor device.

6. The method of claim 5, wherein a cadence of the ringing signal is defined in the ringing request, and establishing the guard time further comprises shortening a ringing interval defined by the ringing request based on the guard time.

7. The method of claim 5, wherein establishing the guard time further comprises shortening a ringing interval of a ringing signal when entering the ringing request into the schedule.

8. The method of claim 1, further comprising:
   removing a ringing signal for a selected subscriber line from the schedule in the processor device responsive to receiving an off-hook indication for the selected subscriber line; and
   recalculating the plurality of ringing counts in the processor device.

9. The method of claim 1, wherein maintaining the schedule comprises maintaining the schedule over a scheduling horizon defined by a maximum cadence duration associated with the ringing signals and the maximum start delay.

10. A line card, comprising:
   a plurality of subscriber line interface circuits operable to generate ringing signals on associated subscriber lines; and
   a ringing scheduler operable to maintain a schedule of the ringing signals, determine a plurality of ringing counts, each specifying a number of subscriber lines ringing at a selected point in the schedule, receive a ringing request for a particular subscriber line, identify a position in the schedule for the ringing request based on the ringing counts that does not exceed a maximum ringing limit, schedule the ringing request in the schedule responsive to identifying the position, and direct the associated subscriber line interface circuit to generate the ringing signal for the particular subscriber line in accordance with the schedule, wherein the ringing scheduler is operable to identify an error condition responsive to not identifying a position in the schedule that does not exceed the maximum ringing limit subject to a maximum start delay between when the ringing request is received and when the ringing signal for the particular subscriber line is scheduled to start.

11. The line card of claim 10, further comprising a subscriber line audio-processing circuit operable to communicate the ringing signal to the subscriber line interface circuit responsive to direction from the ringing scheduler.

12. The line card of claim 10, further comprising identifying an error condition responsive to not identifying a position in the schedule that does not exceed the maximum ringing limit.

13. The line card of claim 10, wherein each ringing signal comprises a cadenced signal including a plurality of ringing intervals and a plurality of silence intervals, and ringing scheduler is further operable to define a node in the schedule for each transition between a ringing interval and a silence interval for each of the ringing signals, and determine a ringing count for each of the nodes.

14. The line card of claim 13, wherein the ringing scheduler is further operable to identify the position by tentatively scheduling the ringing signal associated with the ringing request to start at a first node in the schedule, updating the ringing counts based on the tentatively scheduled ringing signal, and repeating the tentative scheduling and updating of the ringing counts at different nodes in the schedule until the position is identified that results in the updated ringing counts not exceeding the maximum ringing limit.

15. The line card of claim 10, wherein each ringing signal comprises a cadenced signal including a plurality of ringing intervals and a plurality of silence intervals, and the ringing scheduler is operable to establish a guard time between an end of a first ringing interval from one of the subscriber lines and a start of a second ringing interval from another of the subscriber lines.

16. The line card of claim 15, wherein a cadence of the ringing signal is defined in the ringing request, and the ringing request includes a ringing interval shortened based on the guard time.

17. The line card of claim 15, wherein the ringing scheduler is operable to establishing the guard time by shortening a ringing interval of a ringing signal when entering the ringing request into the schedule.

18. The line card of claim 10, wherein the ringing scheduler is operable to remove a ringing signal for a selected subscriber line from the schedule responsive to receiving an off-hook indication for the selected subscriber line, and recalculate the plurality of ringing counts.

19. The line card of claim 10, wherein the ringing scheduler is operable to maintain the schedule over a scheduling horizon defined by a maximum cadence duration associated with the ringing signals and the maximum start delay.

20. The line card of claim 10, further comprising a host processor operable to generate the ringing request and communicate the ringing request to the ringing scheduler.

* * * * *